US007294085B2

(12) United States Patent
Pistagnesi et al.

(10) Patent No.: US 7,294,085 B2
(45) Date of Patent: Nov. 13, 2007

(54) THREE STAGES DIFFERENTIAL ASSEMBLY AND METHOD OF OPERATING THE SAME

(75) Inventors: Anthony H Pistagnesi, Tecumseh (CA); Edward Schrand, Farmington Hills, MI (US); Shawn E Bronner, Detroit, MI (US); Jeffrey Japinga, West Bloomfield, MI (US); Joseph P Elser, Milford, MI (US)

(73) Assignee: Chrysler LLC, Auburn Hills, MI (US)

( * ) Notice: Subject to any disclaimer, the term of this patent is extended or adjusted under 35 U.S.C. 154(b) by 218 days.

(21) Appl. No.: 11/135,798

(22) Filed: May 24, 2005

(65) Prior Publication Data

US 2006/0270510 A1 Nov. 30, 2006

(51) Int. Cl.
*F16H 48/24* (2006.01)

(52) U.S. Cl. ..................... 475/231; 475/240

(58) Field of Classification Search ........... 475/231, 475/240, 237, 198, 204; 180/249
See application file for complete search history.

(56) References Cited

U.S. PATENT DOCUMENTS

| | | | | | |
|---|---|---|---|---|---|
| 4,677,873 | A | * | 7/1987 | Eastman et al. | 475/204 |
| 4,788,888 | A | | 12/1988 | Tsutsumikoshi | 475/237 |
| 5,086,867 | A | * | 2/1992 | Hirota et al. | 180/248 |
| 5,695,426 | A | * | 12/1997 | Lippitsch | 475/204 |
| 6,027,422 | A | * | 2/2000 | Yamazaki | 475/231 |
| 6,117,038 | A | * | 9/2000 | Nishiji et al. | 475/204 |
| 6,450,915 | B1 | | 9/2002 | Kazaoka | 475/231 |
| 2002/0187874 | A1 | | 12/2002 | Kazaoka et al. | 475/231 |
| 2003/0004027 | A1 | * | 1/2003 | Gassmann | 475/221 |
| 2005/0277510 | A1 | * | 12/2005 | Fusegi et al. | 475/231 |
| 2006/0046890 | A1 | * | 3/2006 | Aikawa | 475/231 |

FOREIGN PATENT DOCUMENTS

JP 2-173444 * 7/1990 ............ 475/231

* cited by examiner

*Primary Examiner*—Sherry Estremsky
(74) *Attorney, Agent, or Firm*—Alexander Zelikov

(57) ABSTRACT

Differential assembly and a method of operating the same. The assembly includes a differential case and a pinion housing including a first pinion gear and a second pinion gear positioned substantially therein. A first side gear and a second side gear are operably coupled to the first pinion gear and the second pinion gear. A sliding collar selectively engages at least one of the differential case, the pinion housing, and the first and second side gears. The sliding collar provides at least three engagement modes. The method includes providing a differential case and a pinion housing including a first pinion gear and a second pinion gear positioned substantially therein. A first side gear and a second side gear are provided. At least one of the differential case, the pinion housing, and the first and second side gears are selectively engaged in one of at least three engagement modes.

17 Claims, 4 Drawing Sheets

THREE STAGES DIFFERENTIAL ASSEMBLY AND METHOD OF OPERATING THE SAME

TECHNICAL FIELD OF THE INVENTION

The present invention relates generally to vehicle differentials. More particularly, the invention relates to a three stage differential assembly and a method of operating the same.

BACKGROUND OF THE INVENTION

Differential gear assemblies are utilized in vehicles to translate drive (pinion) shaft rotation into left and right axle shaft rotation, which in turn provides drive force at the wheels. Conventional vehicle differential assemblies allow the wheels to rotate at different rates. This is necessary during vehicle turning when the outside wheel will rotate faster than the inside wheel. This is commonly accomplished through the use of differential side gears and pinion gears located inside the differential case. The differential side gears, each splined to an axle shaft, rotate relative to the differential case and relative to each other. This process is called differentiation, and allows the vehicle to be turned without causing the tires to slip along the road.

One form of differential assembly is commonly known as "open" differential. An "open" differential is a differential assembly without a torque biasing mechanism. In such a system, when the vehicle is driving straight, and a difference in road friction, or traction, exists between the right and left tires, the rotational motion of the differential is transmitted mostly to the wheel with the least grip/lower friction. It is further known that in such "open" differentials, the maximum torque delivered to both wheels is twice the torque delivered to the wheel with less traction. This means that if one tire is placed on a low friction surface, it receives almost zero driveline torque. In addition, the other tire also receives almost zero torque, regardless of the traction available at that tire. To further exacerbate these characteristics, if the torque delivered to the wheel with the less traction exceeds the friction torque acting on the tire-road interface, the wheel may slip. Since the coefficient of dynamic/sliding friction is commonly less than the static/non-sliding friction, a slipping wheel has even less traction than when it is not slipping. Thus, the torque delivered to both wheels is further reduced.

It is known that if the relative motion between the two side gears can be stopped or limited, then both wheels will be forced to rotate at the same speed as the differential, regardless of any difference in traction between the differentiated wheels. By reducing the relative motion, differentiation can be essentially stopped. Unequal amounts of torque can be sent to each wheel, proportional to the difference in traction between the two wheels. This allows the torque to be delivered where it can best be utilized. The mechanism which applies more torque to the wheel with higher traction, yet still allows differentiation, is called a limited slip differential (LSD), a torque-biasing differential, positraction, etc. There are several different types of LSDs including clutch-type LSDs, viscous couplings, "locked" differentials, and Torsion® differentials. Known torque biasing differentials often rely on a friction interface between one of the differential gears (side gear, pinion gear, or reasonable facsimile) in the differential case (the differential gear container which is attached to the ring/driven gear and receives torque from the pinion/driving gear).

Yet another mode known for the operation of a differential includes a so-called "disconnected" mode. In this mode, the "disconnected" wheels are free to rotate independently from each other. This mode is desirable, for example, in a two wheel drive vehicle when two wheels of a non-driving axle are allowed to spin independently from the two wheels of a driving axle. As such, the non-driving axle wheels are "disconnected" from each other and from the driving axle wheels. This mode may be desirable, for example, to improve fuel economy during highway driving situations (i.e., by reducing overall friction forces associated with operating the differential).

SUMMARY OF THE INVENTION

One aspect of the present invention provides a differential assembly. The assembly includes a differential case and a pinion housing. The pinion housing includes a first pinion gear and a second pinion gear positioned substantially therein. A first side gear and a second side gear are operably coupled to the first pinion gear and the second pinion gear. A sliding collar selectively engages at least one of the differential case, the pinion housing, and the first and second side gears. The sliding collar provides at least three engagement modes.

Another aspect of the invention provides a method of operating a differential gear assembly. The method includes providing a differential case and a pinion housing. The pinion housing includes a first pinion gear and a second pinion gear positioned substantially therein. A first side gear and a second side gear are provided and are operably coupled to the first pinion gear and the second pinion gear. At least one of the differential case, the pinion housing, and the first and second side gears are selectively engaged in one of at least three engagement modes.

Another aspect of the invention provides a differential assembly. The assembly includes a differential case and a pinion housing. The pinion housing includes a first pinion gear and a second pinion gear positioned substantially therein. A first side gear and a second side gear are operably coupled to the first pinion gear and the second pinion gear. Means are provided for selectively engaging at least one of the differential case, the pinion housing, and the first and second side gears in one of at least three engagement modes. The engagement modes comprise at least a disconnected mode, an open mode, and a locked mode.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
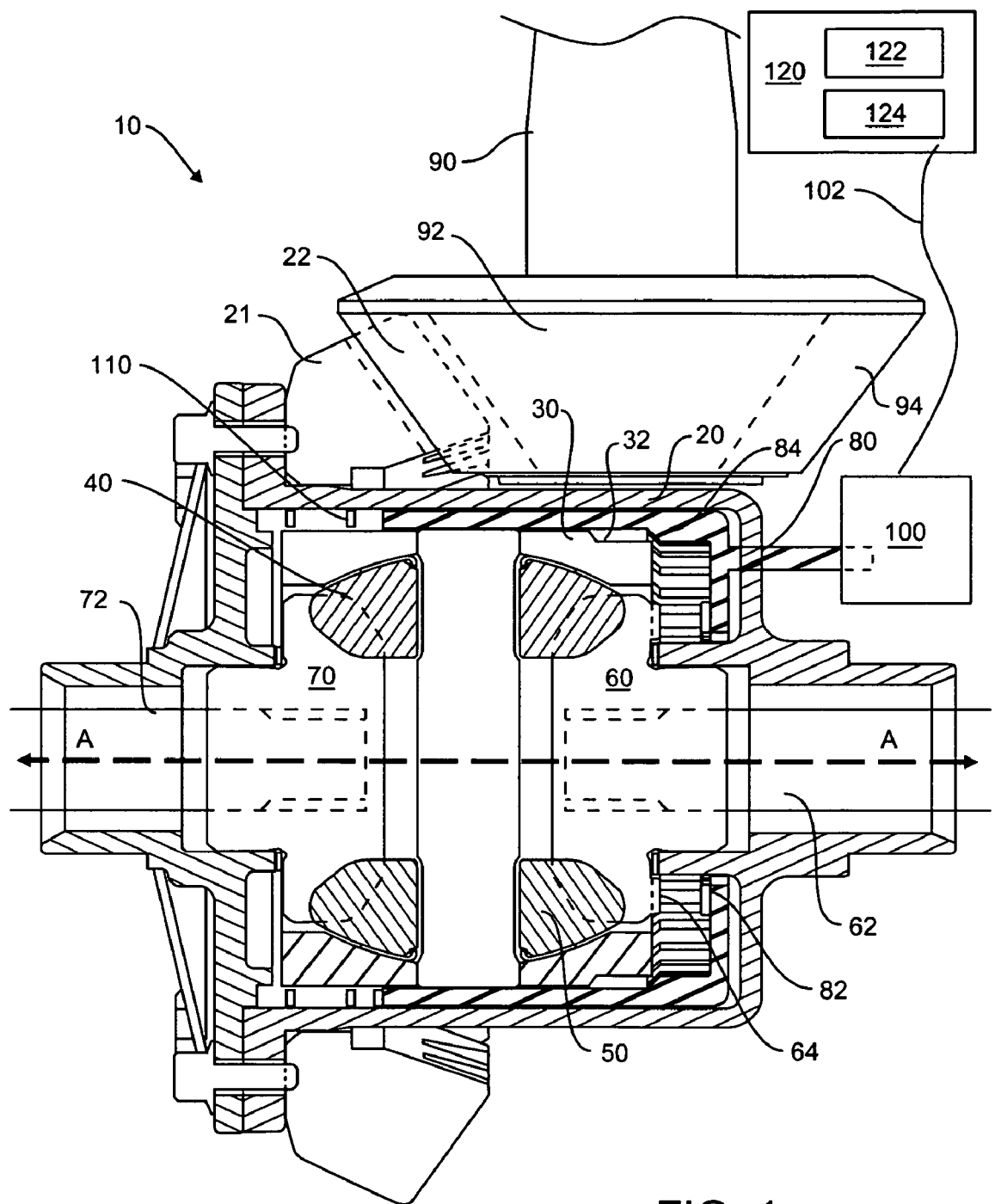
FIG. 1 is a schematic view of a three stage differential assembly in accordance with one embodiment of the present invention.

Referring to the drawings, wherein like reference numerals refer to like elements, FIG. 1 is a schematic view of a three stage differential assembly, shown generally by numeral 10, in accordance with one embodiment of the present invention. Assembly 10 includes a differential case 20 and a pinion housing 30 including a first pinion gear 40 and a second pinion gear 50 positioned substantially therein. A first side gear 60 and a second side gear 70 are operably coupled to the first pinion gear 40 and the second pinion gear 50, respectively. A sliding collar 80 selectively engages at least one of the differential case 20, the pinion housing 30, and the first side gear 60. As described in detail below, the sliding collar 80 provides at least three engagement modes. Those skilled in the art will recognize that the configuration of the assembly 10 may vary from the present description and figures. The inventors contemplate numerous modifications to the assembly 10 that may be adapted for use with the present invention. For example, in another embodiment, third and fourth pinion gears may be adapted for use with the three stage differential assembly.

In one embodiment, a first axle shaft 62 may be operably attached to the first side gear 60. A second axle shaft 72 may be operably attached to the second side gear 70.

The first and second axle shafts 62, 72 may be each operably attached to a vehicle wheel as known in the art. A pinion (drive) shaft may be operably coupled to a vehicle engine for transmitting torque to the vehicle wheels. Pinion shaft 90 may include an input pinion 92, which includes teeth 94 for engaging corresponding teeth 22 of a ring gear 21. Ring gear 21 may be operably coupled (e.g., fastened) to the differential case 20. As such, rotation of the pinion shaft 90 results in rotation of the differential case 20. The gear ratio, that is, the number of teeth 94 relative the number of teeth 22 may vary according to the vehicle and may be determined as known in the art. Sliding collar 80 may include teeth 82 for engaging corresponding teeth 64 of the first side gear 60.

In one embodiment, the sliding collar 80 may be positioned substantially between and rotationally fixed to the differential case 20 and the pinion housing 30. Sliding collar 80 may be free to translate substantially along an axle shaft axis A. Sliding collar 80 may include a shoulder portion 84 for engaging a corresponding shoulder portion 32 of the pinion housing 30. An actuator assembly 100 may be provided for biasing the sliding collar 80. Actuator assembly 100 may comprise a motor for providing an actuator force to bias the sliding collar 80 (i.e., in this case, to the left). A spring assembly 110 may be positioned substantially between the differential case 20 and the sliding collar 80 for biasing the sliding collar 80 in a direction opposite (i.e., in this case, to the right) to that provided by the actuator assembly 100.

In one embodiment, a controller 120 may be provided for determining the selective engagement of the sliding collar 80 with the at least one of the differential case 20, the pinion housing 30, and the first side gear 60. Controller 120 may include a digital microprocessor 122. Controller 120 may be programmed to process input signal(s) received from a vehicle driver as to which differential mode is desired (i.e., by selecting the desired differential mode via, for example, a dashboard selector switch). A computer usable medium including a program for determining the selective engagement of the sliding collar 100 and program code associated with the presently preferred embodiments may be read into and stored in a memory portion 124 (e.g., ROM, RAM, EPROM, EEPROM, and the like) for access by the microprocessor 122, as understood in the art. Furthermore, value tables, variables, parameters, data, and other information may be stored as required in the memory portion 124. Controller 120 may be operably attached to the actuator assembly 100 via a wire 102 or other means. Should the vehicle operator (or other passenger) wish to change the engagement mode, the controller 120 may be activated to operate the actuator assembly 100. For example, the sliding collar 80 may be slidably biased to select between the three engagement modes.

Figure 2A:
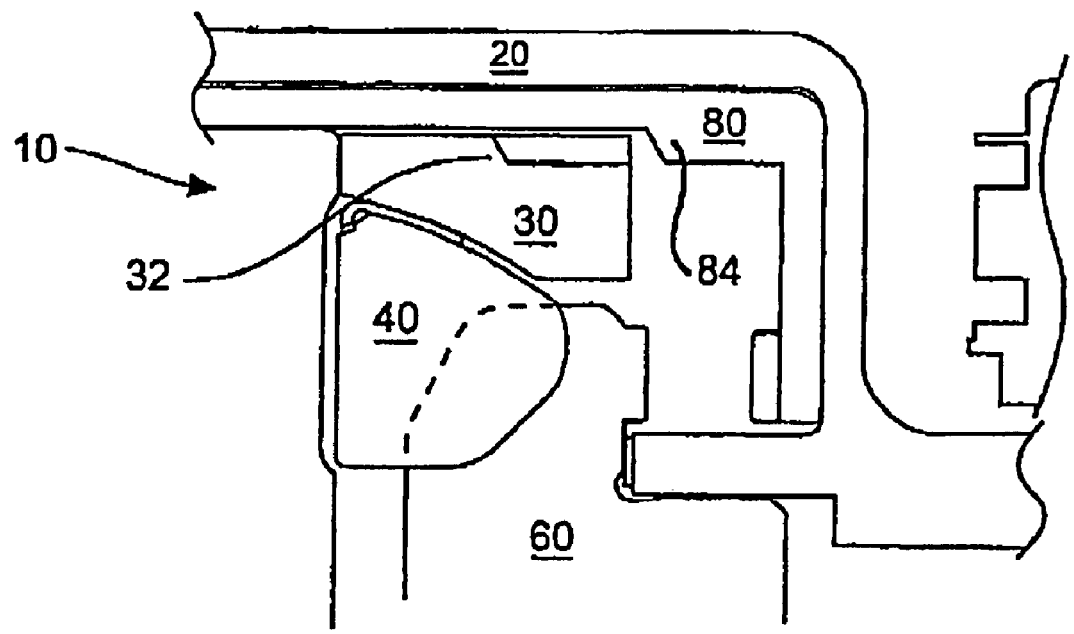
FIGS. 2A and 2B are schematic views showing the assembly of FIG. 1 in a "disconnected" mode.
Figure 2B:
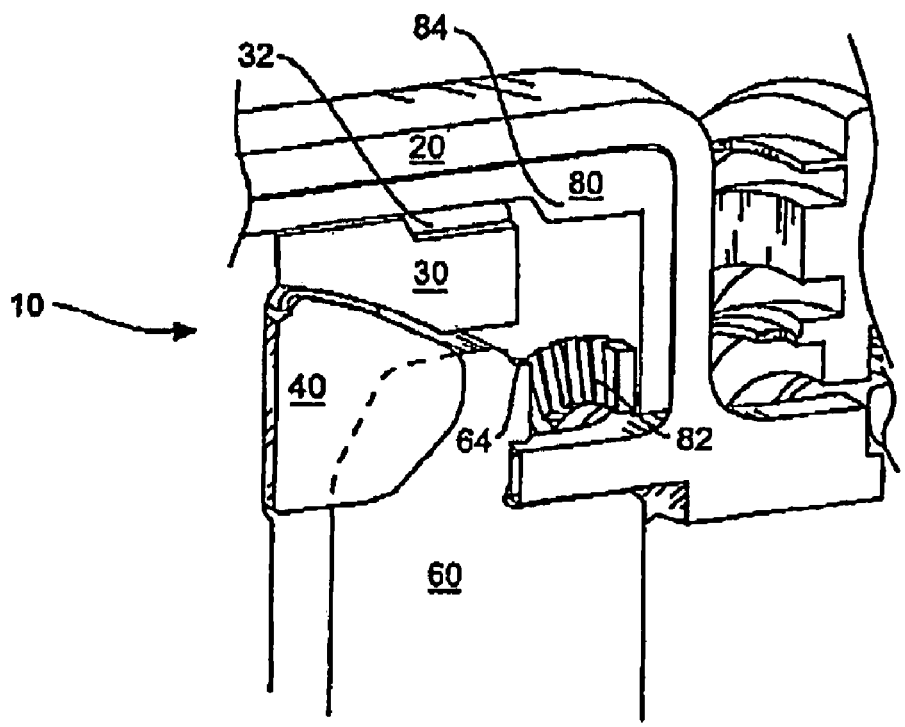

The operation of the assembly 10 will now be described. Referring now also to FIGS. 2A and 2B, the assembly 10 is shown in a "disconnected" mode. In this mode, each of the wheels connected to the first and second axle shafts 62, 72 may rotate independently of each other and from the pinion shaft 90. Sliding collar 80 is positioned out of engagement (i.e., to the rightmost direction as shown in FIG. 2A) with the pinion housing 30 and the first side gear 60. As such, rotation of the pinion shaft 90 is decoupled from rotation of the pinion gears 40, 50 and the side gears 60, 70. This mode is desirable, for example, in a two wheel drive vehicle when two wheels of a non-driving axle are allowed to spin independently from the two wheels of a driving axle. As such, non-driving axle wheels of the assembly 10 are "disconnected" from each other and from driving axle wheels. This mode may be desirable, for example, to improve fuel economy during highway driving situations (i.e., by reducing overall friction forces associated with operating the differential).

Figure 3A:
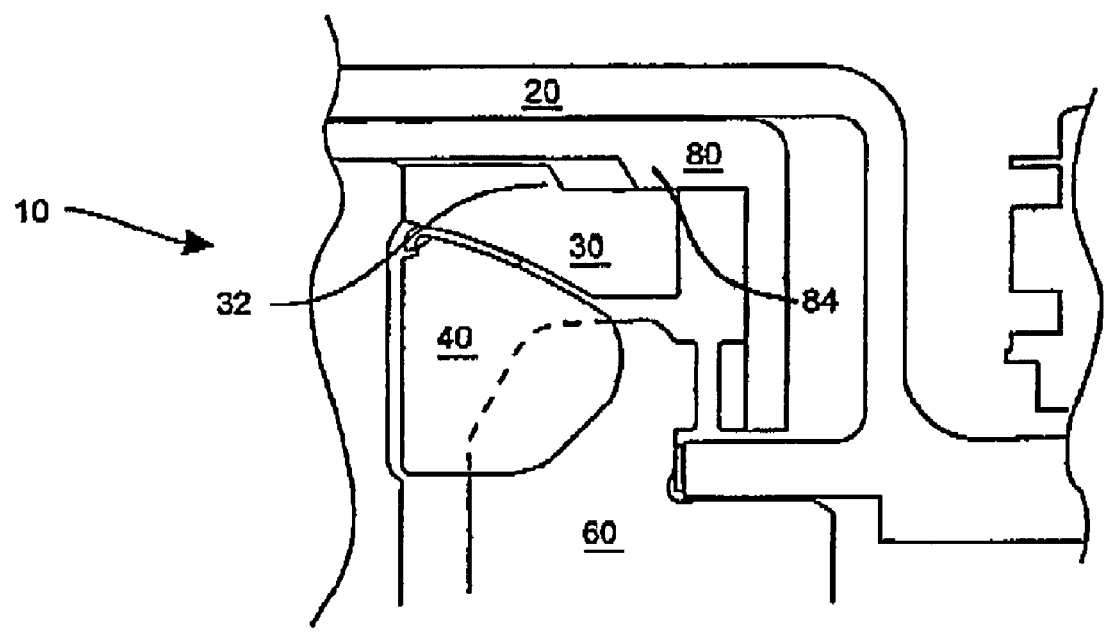
FIGS. 3A and 3B are schematic views showing the assembly of FIG. 1 in an "open" mode.
Figure 3B:
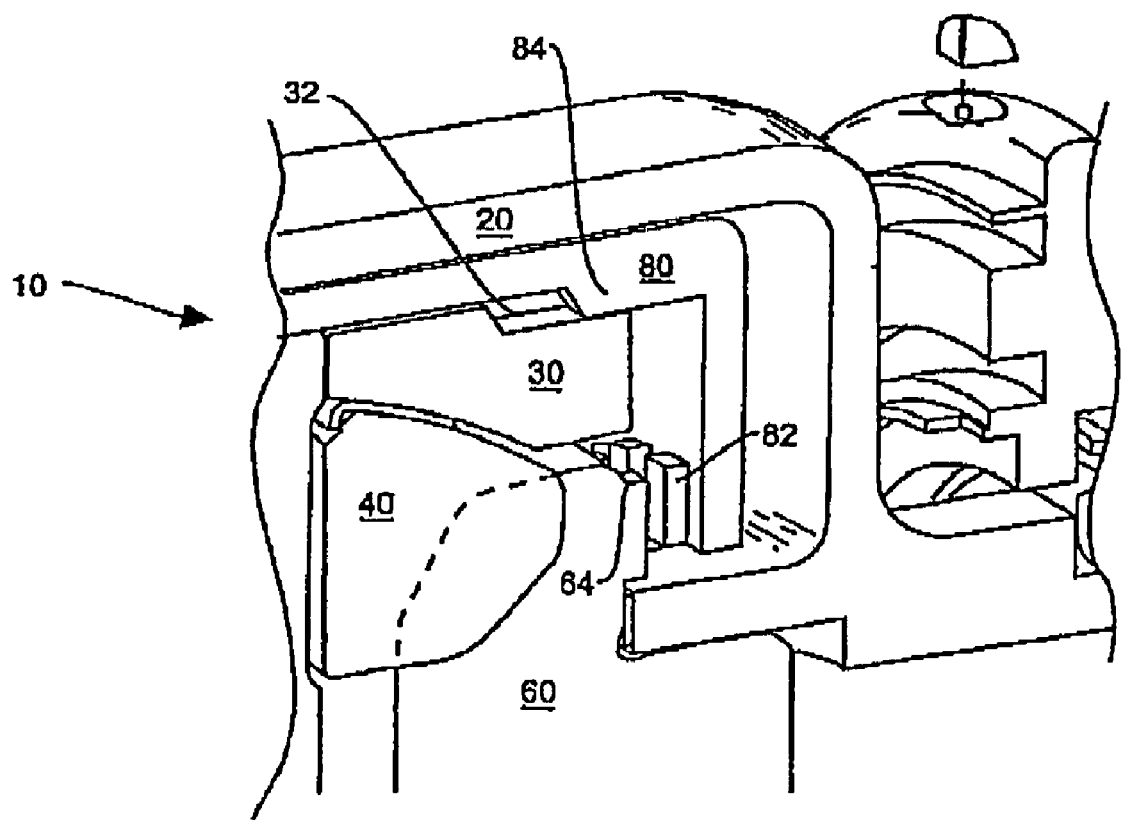

Referring now also to FIGS. 3A and 3B, the assembly 10 is shown in an "open" mode. In this mode, when the vehicle is driving straight, and a difference in road friction results in slippage between the right and left wheels, the rotational motion of the assembly 10 is transmitted mostly to the wheel with the least grip/lower friction. Sliding collar 80 is positioned into engagement (i.e., to the left direction of the configuration shown in FIG. 2A) with the pinion housing 30, but not into engagement with the first side gear 60. Specifically, the sliding collar 80 shoulder portion 84 engages the corresponding shoulder portion 32 of the pinion housing 30. As such, rotation of the pinion shaft 90 is directly coupled to rotation of the pinion gears 40, 50 allowing the wheels to have the same torque, but to turn at different speeds.

When the vehicle is driving straight down the road, both wheels spin essentially at an equivalent speed. Pinion shaft 90 turns the differential case 20, but neither of the pinion gears 40, 50 rotate—both side gears 60, 70 are effectively coupled to the differential case 20. When the vehicle turns, the pinion gears 40, 50 start to spin during the turn, allowing the wheels to move at different speeds. The inside wheel spins slower than the differential case 20, while the outside wheel spins faster. In dry conditions, when there is sufficient traction, the amount of torque applied to the wheels is limited by the engine and gearing; in a low traction situation, such as when driving on ice, the amount of torque is limited to the greatest amount that will not cause a wheel to slip under those conditions.

Figure 4A:
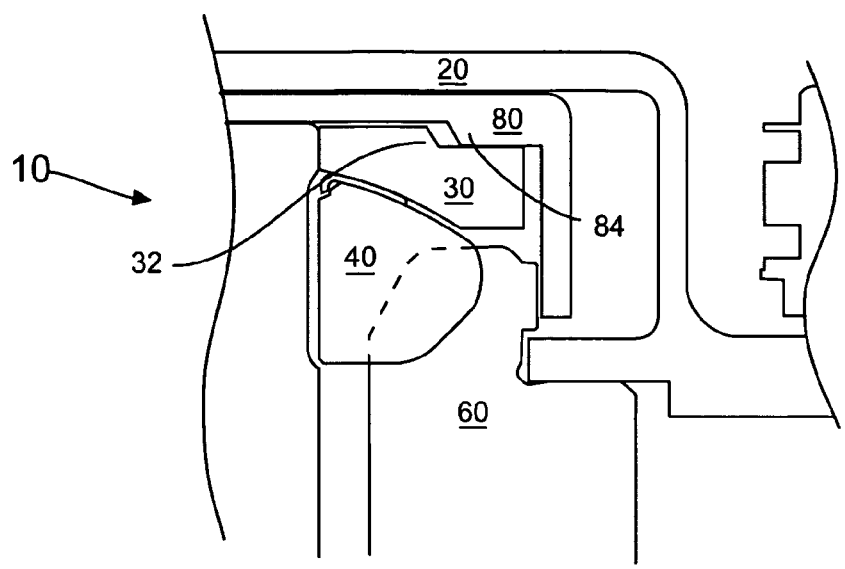
FIGS. 4A and 4B are schematic views showing the assembly of FIG. 1 in a "locked" mode, the view of FIG. 4B including a detailed view of a portion thereof.
Figure 4B:
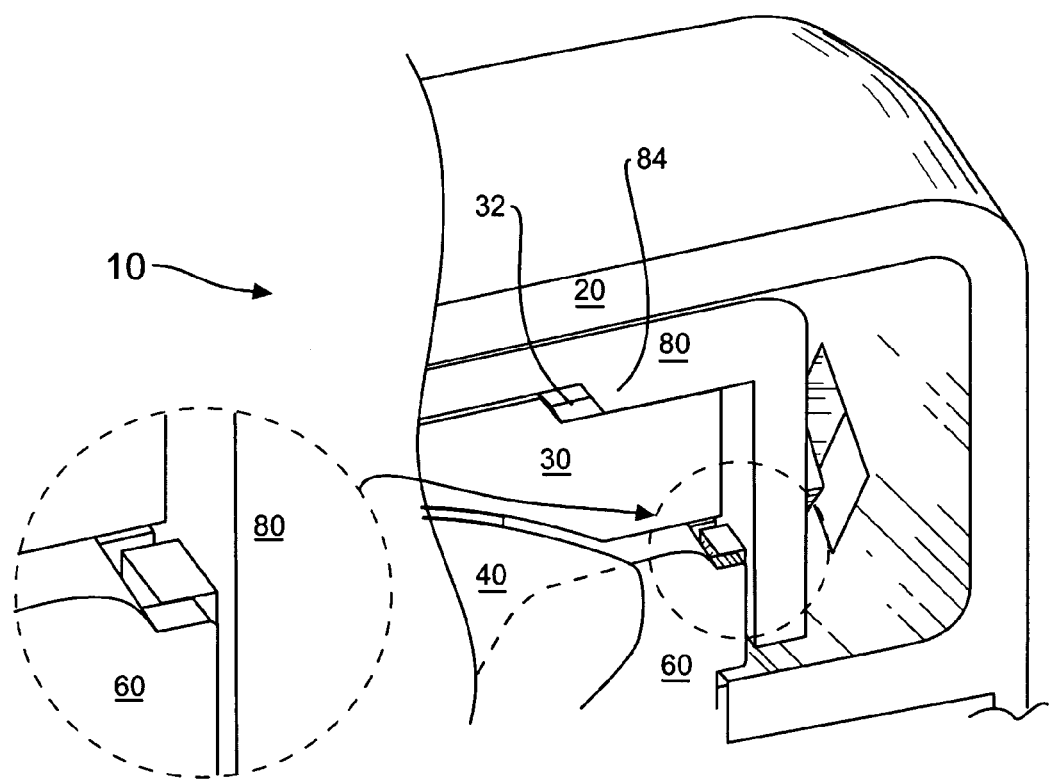

Referring now to FIGS. 4A and 4B, the assembly 10 is shown in a "locked" mode. In this mode, the relative motion between the side gears 60, 70 is stopped or limited, and both wheels are forced to rotate at the same speed as the differential case 20, regardless of any difference in traction between the differentiated wheels. By reducing the relative motion, differentiation can be essentially stopped. Unequal amounts of torque can be sent to each wheel, proportional to the difference in traction between the two wheels. This allows the torque to be delivered where it can best be utilized. In this mode, the sliding collar 80 is positioned into engagement (i.e., to the left direction of the configuration shown in FIG. 3A) with the pinion housing 30 and the first side gear 60 via the corresponding teeth 64, 82. The engagement of the sliding collar 80 with the first side gear 60 results in a locking of the second side gear 70 as well. As such, rotation of the pinion shaft 90 is directly coupled to rotation of the pinion gears 40, 50 and the side gears 60, 70 allowing the wheels to have the same speed, but independent torques.

The present invention thus provides a single differential capable of operating in all three of the "open," "locked," and "differential" modes. While the embodiments of the invention disclosed herein are presently considered to be preferred, various changes and modifications can be made without departing from the spirit and scope of the invention. For example, the three stage differential assembly configuration, and method of operating the same are not limited to any particular design or sequence. Specifically, the differential case, ring gear, pinion housing, pinion gears, side gears, sliding collar and method of operating the same may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. A differential assembly comprising:
   a differential case;
   a pinion housing including a first pinion gear and a second pinion gear positioned substantially therein;
   a first side gear and a second side gear operably coupled to the first pinion gear and the second pinion gear; and
   a sliding collar biased by a spring assembly for selectively engaging at least one of the differential case, the pinion housing, and the first side gear; wherein the sliding collar provides at least three engagement modes.

2. The assembly of claim 1 wherein the at least three engagement modes comprises at least a disconnected mode.

3. The assembly of claim 1 wherein the at least three engagement modes comprises at least an open mode.

4. The assembly of claim 3 wherein the sliding collar engages the pinion housing with a shoulder portion.

5. The assembly of claim 1 wherein the at least three engagement modes comprises at least a locked mode.

6. The assembly of claim 5 wherein the sliding collar engages the first side gear with corresponding teeth.

7. The assembly of claim 1 wherein the sliding collar translates substantially along an axle shaft axis.

8. The assembly of claim 1 wherein the first side gear is operably attached to a first axle shaft, and the second side gear is operably attached to a second axle shaft.

9. The assembly of claim 1 further comprising an actuator assembly for biasing the sliding collar.

10. The assembly of claim 1 further comprising a controller for determining the selective engagement of the sliding collar with the at least one of the differential case, the pinion housing, and the first side gear.

11. A method of operating a differential gear assembly:
    providing a differential case;
    providing a pinion housing including a first pinion gear and a second pinion gear positioned substantially therein;
    providing a first side gear and a second side gear operably coupled to the first pinion gear and the second pinion gear; and
    selectively engaging by a sliding collar at least one of the differential case, the pinion housing, and the first side gear in one of at least three engagement modes; wherein the sliding collar is biased by a spring assembly.

12. The method of claim 11 wherein the at least three engagement modes comprises at least a disconnected mode.

13. The method of claim 11 wherein the at least three engagement modes comprises at least an open mode.

14. The method of claim 11 wherein the at least three engagement modes comprises at least a locked mode.

15. The method of claim 11 wherein the first side gear is operably attached to a first axle shaft, and the second side gear is operably attached to a second axle shaft.

16. The assembly of claim 11 wherein biasing the sliding collar comprises translating the sliding collar substantially along an axle shaft axis.

17. The method of claim 11 further comprising determining the selective engagement of the at least one of the differential case, the pinion housing, and the first side gear.

* * * * *